US008890343B2

(12) United States Patent
Bulin et al.

(10) Patent No.: US 8,890,343 B2
(45) Date of Patent: Nov. 18, 2014

(54) ELECTRIC GENERATOR DISPOSED ON A ROTATING TURBOPROP PART

(75) Inventors: Guillaume Bulin, Blagnac (FR); Severine Perret, Leguevin (FR); Jean-Michel Rogero, Toulouse (FR)

(73) Assignee: Airbus Operations S.A.S., Toulous (FR)

( * ) Notice: Subject to any disclaimer, the term of this patent is extended or adjusted under 35 U.S.C. 154(b) by 356 days.

(21) Appl. No.: 13/318,434

(22) PCT Filed: May 3, 2010

(86) PCT No.: PCT/FR2010/050843
§ 371 (c)(1),
(2), (4) Date: Mar. 6, 2012

(87) PCT Pub. No.: WO2010/128241
PCT Pub. Date: Nov. 11, 2010

(65) Prior Publication Data
US 2012/0156039 A1 Jun. 21, 2012

(30) Foreign Application Priority Data

May 5, 2009 (FR) ..................................... 09 52969

(51) Int. Cl.
| B64C 11/44 | (2006.01) |
| F02C 7/32 | (2006.01) |
| H01L 35/32 | (2006.01) |
| B64C 11/48 | (2006.01) |
| F01D 15/10 | (2006.01) |
| B64D 27/02 | (2006.01) |

(52) U.S. Cl.
CPC ................ B64C 11/48 (2013.01); F01D 15/10 (2013.01); F02C 7/32 (2013.01); B64D 2027/026 (2013.01); Y02T 50/66 (2013.01)
USPC ............................................. 290/2; 416/153

(58) Field of Classification Search
CPC ............................... H02K 7/1823; H02K 7/18
USPC ............................. 290/1 R, 4 R, 52; 318/117
See application file for complete search history.

(56) References Cited

U.S. PATENT DOCUMENTS

| 4,738,591 A | 4/1988 | Butler |
| 4,927,329 A | 5/1990 | Kliman et al. |

(Continued)

FOREIGN PATENT DOCUMENTS

| CN | 1428020 A | 7/2003 |
| CN | 1641188 A | 7/2005 |

(Continued)

OTHER PUBLICATIONS

International Search Report Issued Mar. 4, 2011 in PCT/FR10/050843 Filed May 3, 2010.

(Continued)

*Primary Examiner* — Tulsidas C Patel
*Assistant Examiner* — Sean Gugger
(74) *Attorney, Agent, or Firm* — Oblon, Spivak, McClelland, Maier & Neustadt, L.L.P.

(57) ABSTRACT

An electrical energy generating device for a propfan-type aircraft propulsion unit rotor. The propulsion unit includes a turbomachine that drives in rotation at least one rotor including a plurality of blades arranged around an annular crown moving with the blades, which forms with its outer wall part of an outer envelope of the propulsion unit, the outer envelope being subjected to atmospheric conditions outside the propulsion unit. The turbomachine generates a flow of hot gases that exit via an annular hot vein, which is concentric with the moving annular crown, and defined for part of its surface by an inner wall of the moving annular crown, and includes, within the moving annular part, a mechanism to transform thermal energy into electrical energy, preferably by thermal diodes. Such a device, as an example, can find application to a device for controlling a pitch of rotors of a propfan-type propulsion unit.

13 Claims, 4 Drawing Sheets

(56) References Cited

U.S. PATENT DOCUMENTS

Figure 1:
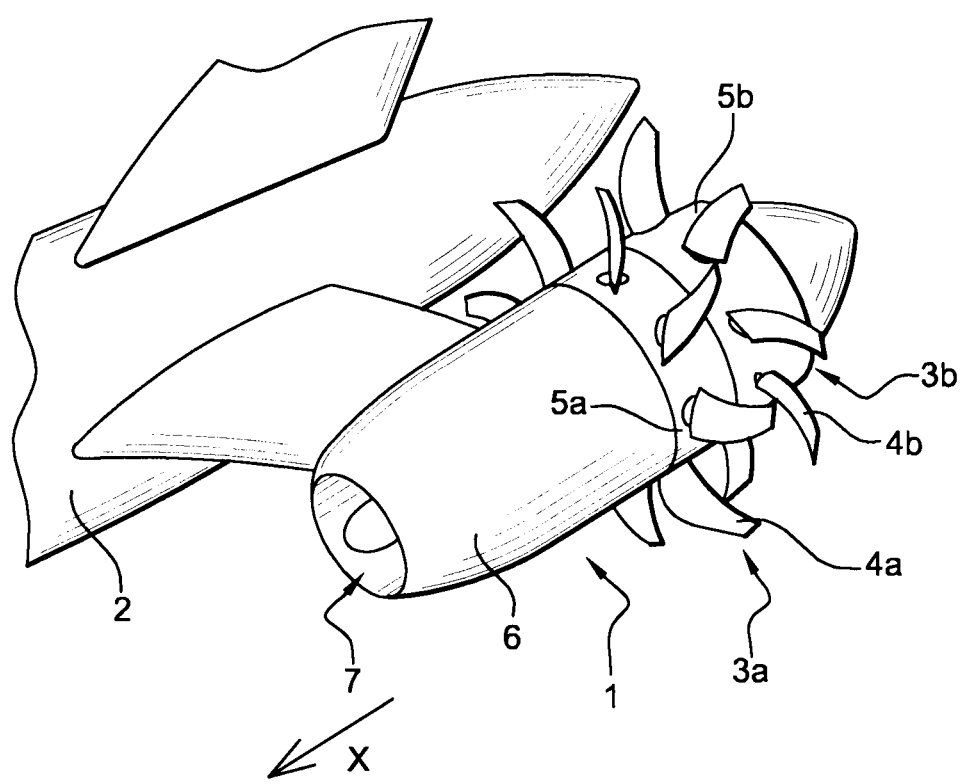

| | | | |
|---|---|---|---|
| 5,224,831 A * | 7/1993 | Hermans et al. | 416/129 |
| 6,590,304 B1 * | 7/2003 | Manning et al. | 307/131 |
| 2003/0077173 A1 * | 4/2003 | Franchet et al. | 416/30 |
| 2005/0022855 A1 * | 2/2005 | Raver | 136/205 |
| 2007/0018038 A1 * | 1/2007 | Jarmon et al. | 244/59 |
| 2007/0261729 A1 * | 11/2007 | Hu | 136/204 |
| 2009/0159110 A1 * | 6/2009 | Kwok et al. | 136/205 |

FOREIGN PATENT DOCUMENTS

| | | |
|---|---|---|
| DE | 199 46 806 | 4/2001 |
| DE | 10 2007 036 930 | 4/2009 |
| EP | 1 306 558 | 5/2003 |
| FR | 1 504 078 | 12/1967 |
| GB | 2 194 990 | 3/1988 |
| WO | 01 61768 | 8/2001 |

OTHER PUBLICATIONS

Combined Chinese Office Action and Search Report issued Dec. 18, 2013 in Patent Application No. 201080019927.X (with English language translation).

* cited by examiner

ELECTRIC GENERATOR DISPOSED ON A ROTATING TURBOPROP PART

The present invention falls within the field of aeronautical equipment. It relates more specifically to electrical power generators on board aircraft. In this case, it envisages in particular an electrical generator located on a rotating part making it possible to locally supply the energy required for a pitch control system or for feathering of the blades of a propfan-type turboprop rotor.

Traditionally, the propeller pitch is controlled through a mechanical or hydraulic system.

It is known that, if a propeller propulsion unit fails during flight, the blades of this propeller are feathered to minimize the drag generated, via a pitch control mechanism usually mounted on the axis of each blade.

With the advent of propfan-type propulsion units, comprising two counter-rotating rotors, and envisaged as propulsion units for commercial aircraft, the problem thus arises of implementing redundancy for this feathering device, and more generally for controlling the pitch of the rotor blades.

One solution is to install an electric motor in the rotor, at the base of each blade, the engine being powered from the static part by various means of transmitting power.

Rotating contact devices are known in this field that ensure the transmission of electrical energy between a fixed shaft and a moving annular part by using electro-conductive brushes fixed on the shaft that slide on an annular track of the rotating part.

One of the main drawbacks of these rotating contact systems is linked to the speed of the brushes in relation to the moving track, this speed being in general close to one hundred meters per second and depending naturally on the diameter of the annular track and on the speed of rotation of this part.

The consequence of this for all these rotating contact systems is rapid wear of the brushes, leading to reduced performance and a requirement for frequent and costly maintenance. The lack of lubrication of the blades (for reasons of complexity) also contributes to significantly reducing this life span.

In the case of a propfan's front propeller, the diameter of the turbomachine's core results in a relative speed of the moving part with respect to the static part of about four hundred meters per second; this makes the brushes and moving track systems unusable in practice because it exceeds the specifications of devices available commercially.

The situation is further exacerbated in the case of propfans by the counter-rotating characteristic of the two propellers.

The objective of this invention is therefore to propose an electrical power generating device to meet the electrical needs of a propfan-type propulsion unit rotor, which avoids the above-mentioned disadvantages.

A second objective of the invention to propose a backup device for feathering the rotor's blades, in case the main pitch control device fails.

To this end, the invention envisages an electric power generating device for a rotor of a propfan-type of aircraft propulsion unit, said propulsion unit comprising a turbomachine rotating at least one rotor comprising a plurality of blades positioned around an annular crown that moves with these blades, the outer wall of the annular crown forming part of the outer skin of the propulsion unit, said outer skin being subjected to the atmospheric conditions outside the propulsion unit, said turbomachine generating a flow of hot gases that are released through a hot annular channel, concentric with the moving annular crown and having a portion of its surface defined by the inner wall of said moving annular crown;

the electric power generating device comprises means of transforming the thermal energy into electrical energy, within the moving annular part.

Preferably, the means for transforming thermal energy into electrical energy comprises an electrical generator comprising an assembly of thermal diodes using the Seebeck effect, positioned between the annular crown's inner wall and outer wall, acting respectively as the hot and cold sources for these thermal diodes; said thermal diodes are arranged in groupings serially and in parallel so as to obtain on output from the electrical generator a voltage and amperage compatible with the deicing requirements of the rotor blades.

According to an advantageous embodiment, the thermal diodes are of $Pb_{0.5}Sn_{0.5}Te$ type.

According to an advantageous embodiment, caloducts are provided between one of the annular crown's walls and one surface of the thermal diodes.

Alternatively, the electric power generating device for a propulsion unit rotor comprises means of channeling either hot air from the hot annular vein or outside air towards a wall on which the thermal diodes are installed.

It is understood that it is necessary to cater for the distance that exists in the propulsion unit between the hot and cold areas, in view of their use as thermal diode hot and cold sources.

According to various arrangements that may be used together:
- the electrical generator extends in annular fashion over substantially the whole of the inner perimeter of the annular crown,
- the device comprises means of controlling the temperature difference between the hot and cold sources of the thermal diodes, controlled according to the instructions of an electronic control unit for the current generated by the diodes.

It is understood that this last arrangement allows a feedback process to be created that maximizes in real-time the energy yield of the thermal diodes.

To optimize the use of the electrical energy generated by the electrical generator, this last comprises favorably an electronic control unit to which all the thermal diodes supply the generated current; this electronic control unit is designed to measure the available electrical power and distribute it amongst the users of electrical energy and to select a cyclical supply mode for said users of energy in case the amount of power generated is below a predefined threshold.

The threshold will be selected, for example, such as to characterize the moment when the amount of power generated is insufficient for a permanent parallel supply to all the users.

Under a second aspect, the invention envisages an orientation device for the blades of a rotor of an aircraft propulsion unit of the type called "propfan", where said propulsion unit comprises a turbomachine that drives in rotation at least one rotor comprising a plurality of blades arranged around an annular crown moving with these blades, which forms with its outer wall part of the outer envelope of the propulsion unit, said outer envelope being subjected to the atmospheric conditions outside the engine, said turbomachine generating a flow of hot gases that exit via an annular hot vein, which is concentric with the moving annular crown and defined for part of its surface by the inner wall of said moving annular crown, comprising:
a device for generating electrical power according to any one of the preceding claims,
means of transferring this electric power to electric motors that adjust the pitch of the rotor's blades,
means of controlling these electric motors.

According to another aspect, the invention envisages an aircraft comprising at least one device such as described.

Figure 2:
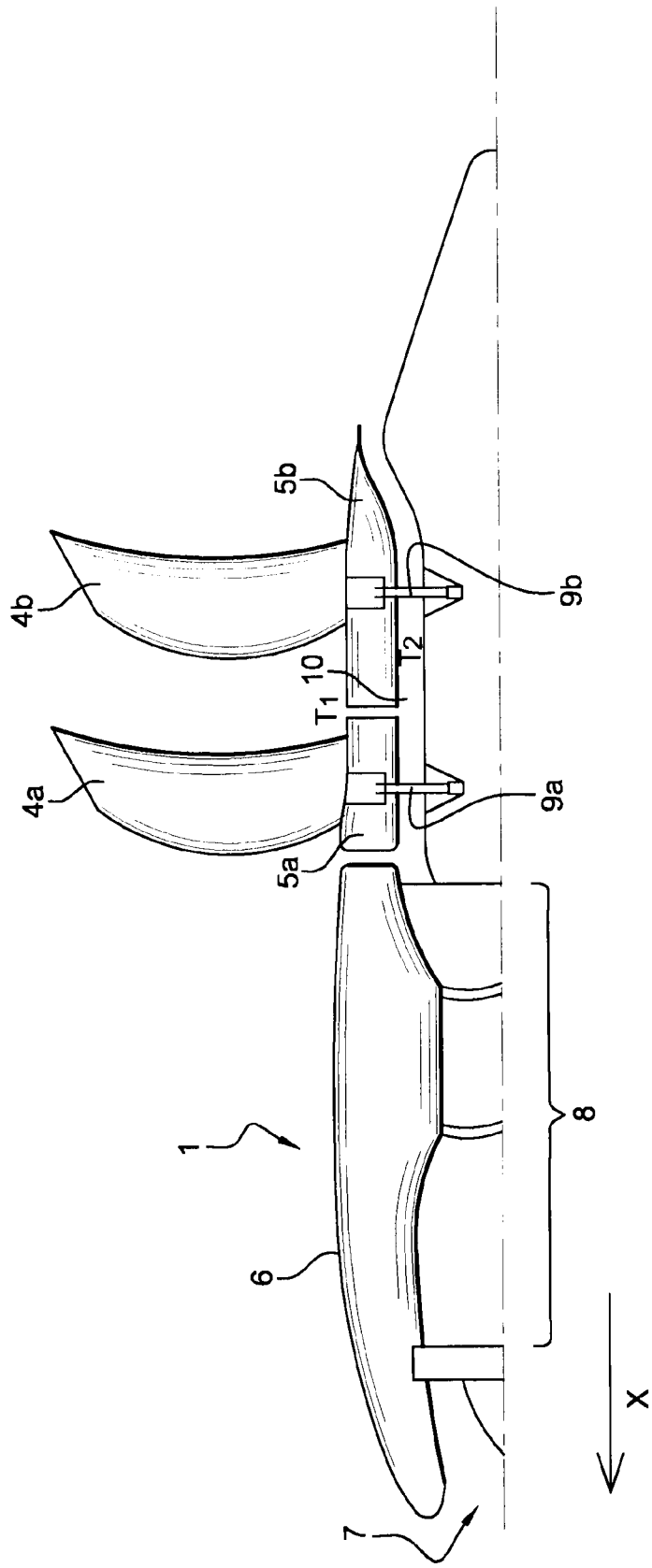
Figure 3:
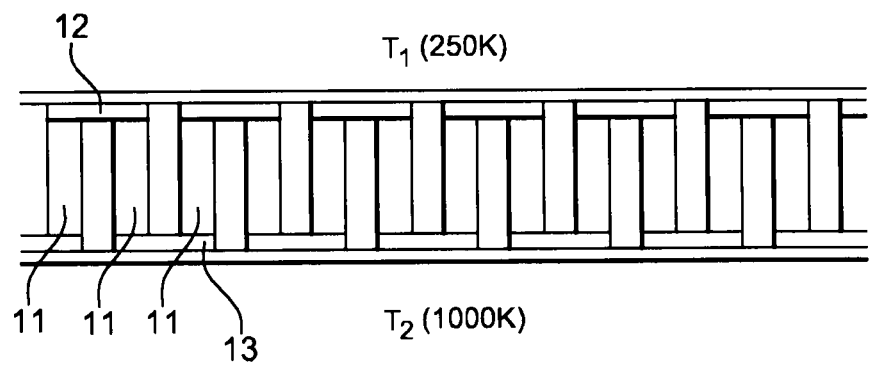
Figure 4:
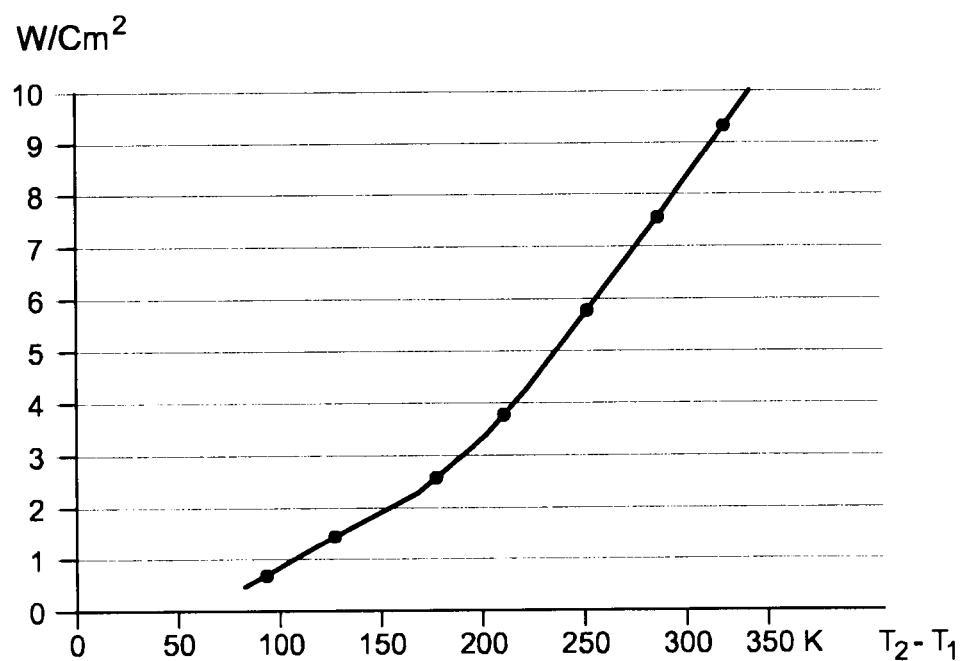
Figure 5:
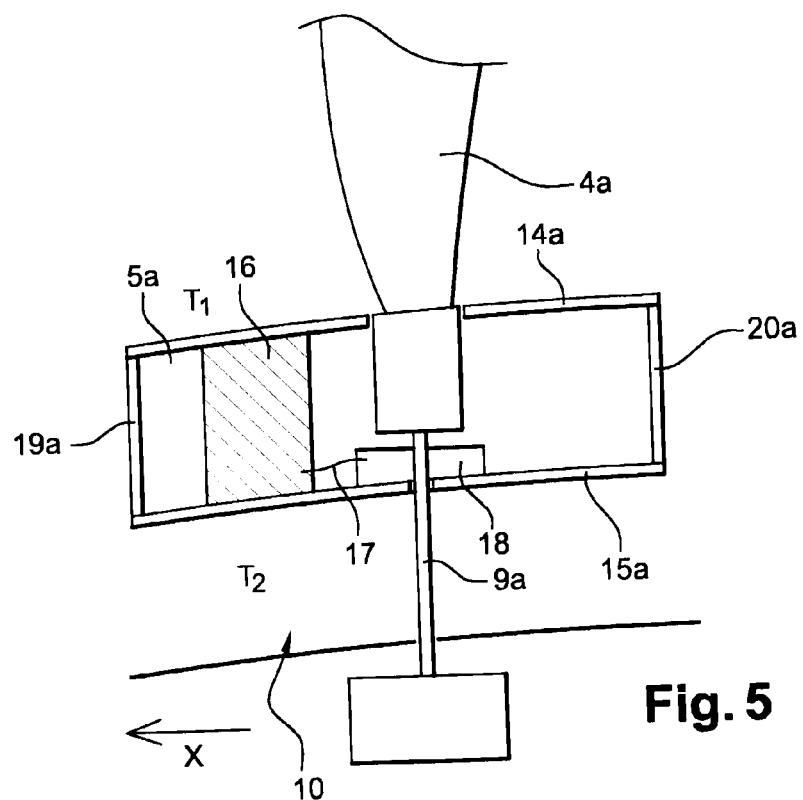
Figure 6:
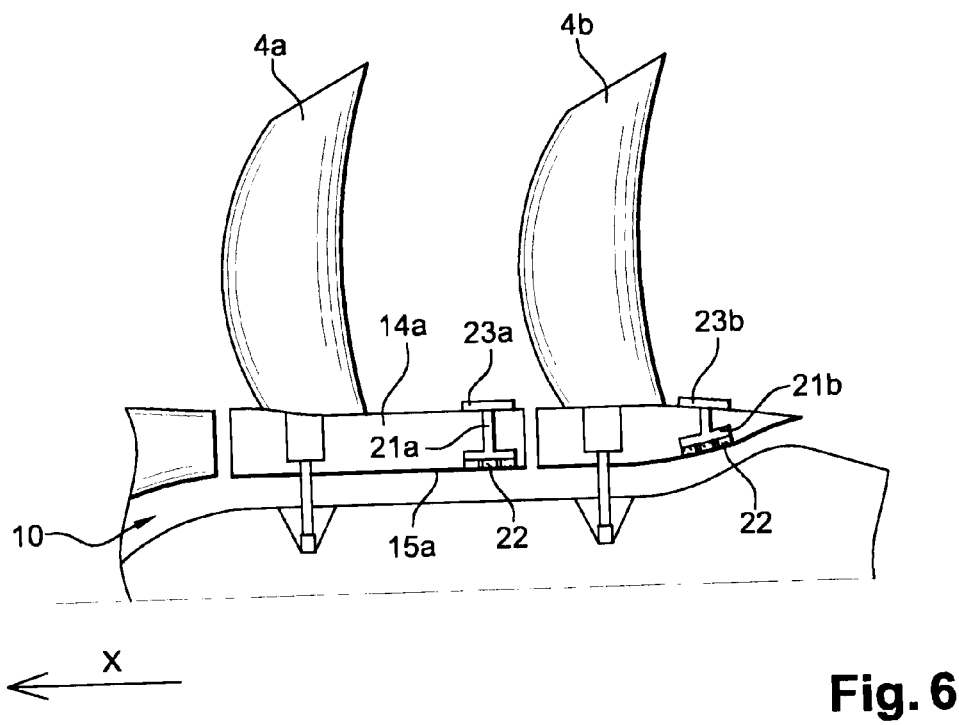

The description that follows, given solely as an example of an embodiment of the invention, is made with reference to the figures included in an appendix, in which:

FIG. 1 shows a propfan-type propulsion unit, to which the invention can be applied, FIG. 2 illustrates such a propulsion unit in a very schematic cross-section view, FIG. 3 shows schematically the assembly principle of a Seebeck-effect electrical generator, FIG. 4 shows the electrical power density that can be obtained with a commercially available thermal diode, depending on the available temperature difference, FIG. 5 illustrates an electricity generating device for a motor orienting rotor blades according to the invention FIG. 6 illustrates an implementation example of the thermal diodes on the two rotors of the propfan.

The invention is destined to be used in an airplane propulsion unit 1, for example of the type called "propfan", as shown in FIG. 1. Such propulsion units are envisaged for future aircraft. In the example of implementation illustrated here, two propfan propulsion units 1 are attached by engine pylons, on both sides of the rear part of an aircraft fuselage 2.

Each propfan propulsion unit 1 here comprises two counter-rotating rotors 3a, 3b each comprising a set of equidistant blades 4a, 4b and positioned in the rear part of the propulsion unit 1. The blades 4a, 4b of each rotor 3a, 3b protrude from an annular crown 5a, 5b, which is mobile with this rotor, the outer surface of which is located in the continuity of the outer envelope 6 of the propulsion unit.

As shown schematically in FIG. 2 the propfan propulsion unit 1 comprises an air inlet 7 that supplies a turbomachine 8. This turbomachine 8 comprises an axial portion driven in rotation when the turbomachine is running. This axle in turn drives, through mechanical transmissions not shown in FIG. 2, the axles 9a, 9b of the blades 4a, 4b of the two counter-rotating rotors 3a, 3b.

The hot gases generated by the turbomachine 8 when in operation are discharged through a hot annular channel 10 having an outlet located at the rear of the two rotors 3a, 3b.

The realization details of propfans and their components—rotors, turbomachine, transmission, and their dimensions, materials etc.—are outside the framework of this invention. The elements described here are therefore provided only for information purposes, to facilitate understanding of the invention in one of its non-limiting examples of implementation.

Thus, as is apparent from the above description, during the aircraft's flight the outside air, whose temperature is between +15° C. near the ground and −50° C. at altitude, circulates along the annular crowns 5a, 5b of the propellers, substantially in the opposite direction to the longitudinal axis X of movement of the aircraft.

At the same time, the gases circulating in the hot annular channel 10 have a temperature usually between 600 and 800° C.

The deicing device according to the invention takes advantage of this significant temperature difference at some twenty centimeters distance by using Seebeck-effect assemblies that allow thermal energy to be transformed into electrical energy.

As a preliminary, it is stated that the thermoelectric effect (Seebeck effect) is defined by the potential difference between the two terminals of a conductor when they are subjected to different temperatures. This effect is used in temperature measurements using thermocouples. This is the opposite of the Peltier effect, in which applying a potential difference between the terminals of a conductor causes the creation of a temperature difference between these terminals.

Seebeck-effect power generation generally implies creating closed circuits comprising a set of conductors 11, linked two by two by junctions 12, 13, one of them subjected to a first temperature T1 and the other to a second temperature T2 (FIG. 3).

Various studies show that the materials that provide the best thermoelectric yield are those that fulfill requirements of high electrical conductivity, low thermal conductivity and high Seebeck coefficient. Several materials suitable for use in thermal diodes are currently known. Amongst these, are Mercury Cadmium Telluride ($Hg_{0.86}$ $Cd_{0.14}$ Te), Bismuth telluride ($Bi_2$ $Te_3$), Silicon nano threads, etc.

It should also be noted that thermoelectric materials each have favorable characteristics within a given temperature range (Lead telluride around 550-750K, Bismuth telluride around 250-350K, etc.) Therefore, in cases where the temperature difference between hot (T2) and cold (T1) areas, which is the case for example in this implementation example on a propfan propulsion unit (T1 close to 250K and T2 close to 1000K) it is advantageous to use several superposed materials to make up each conductor 11.

The yield for conversion between thermal energy and electrical energy is currently of the order of 30% of the ideal Carnot yield for a 300K temperature difference between the hot and cold areas, which corresponds to a theoretical yield of 13% approximately (13% of the thermal energy converted to electrical energy). With a 700K temperature difference, an 18% yield is obtained.

Because of the mass characteristics of commercially-available diodes, a yield of 30% of the Carnot ideal corresponds to a power-to-weight ratio of 1,000 watts/kg of installed diodes.

FIG. 4 illustrates the electric power density that can be achieved per unit of area, depending on the available temperature difference, for a commercially available $Pb_{0.5}$ $Sn_{0.5}$ type thermal diode. It can be seen that for temperature gradient values of the order of 350K, electrical power of 10 watts/cm$^2$ can be obtained.

These values demonstrate that the use of thermal diodes is compatible with the constraints concerning size, volume and mass available and the electric power needed to feather the blades of a rotor of a propfan-type of propulsion unit.

Indeed, this last generates about 200 kW of thermal power, evacuated via the annular hot vein 10.

Feathering the blades of a rotor of the propfan requires approximately 5 kW of electrical power. Therefore, feathering the blades of the two rotors 3a, 3b of the propfan requires 10 kW.

The mass of the thermal diodes required to supply this electrical power is therefore approximately 10 kg. This value is compatible with existing mass constraints on aircraft and with volumetric constraints linked to the design of the rotors of propfans. Effectively, each annular crown 5a, 5b has an inner wall 15a, 15b and an outer wall 14a, 14b, separated by some twenty centimeters approximately, for an annular crown 5a, 5b inner diameter of several tens of centimeters and an annular crown 5a, 5b width (along the longitudinal axis X) of a few tens of centimeters.

The electricity generating device for a rotor according to the invention (FIG. 5) is here described for the front rotor 3a of the propulsion unit envisaged. An identical device is envisaged for the aft rotor 3b. The device uses the space available within the annular crown 5a of each rotor 3a to place a thermal diode 22 electrical generator 16.

The electrical generator 16 is made of a set of thermal diodes 22 installed between the inner wall 15a and the outer wall 14a of the annular crown 5a. FIG. 6 illustrates an implementation example of these thermal diodes 22 on the two rotors 3a, 3b of the propfan.

The thermal diodes 22 under consideration are, for example, of $Pb_{0.5} Sn_{0.5}$ Te, delivering a 13% yield approximately.

Depending on the normal operating thickness of the thermal diodes 22 under consideration between the cold source (the outer wall 14a, 14b of each annular crown 5a, 5b) and the hot source (the inner wall 15a, 15b of each annular crown 5a, 5b opposite the annular hot vein 10), caloducts 21 of know type are installed between one of the walls of the annular crown 5a and a surface of the thermal diodes 22. On the cold source side, the device comprises advantageously a heat sink 23, for example in the form of metal blades parallel to the airflow (i.e. to the aircraft's longitudinal axis) creating a large thermal exchange surface with the outside environment.

It is clear that, as a variant, it is possible to invert this layout. The thermal diodes 22 are then positioned near the outer wall 14a, 14b of each annular crown 5a, 5b. In this case, the heat sinks 23 are installed within the annular hot vein 10, on the inner wall 15a, 15b of each annular crown 5a, 5b and the caloducts 21 transport the heat from this hot source towards the thermal diodes 22.

These thermal diodes 22 are arranged in groupings serially and in parallel by means known per se so as to obtain on output from the electrical generator 16 a voltage and amperage compatible with the electrical needs of the rotor and typically the needs related to feathering the blades 4a of the rotor 3a.

Preferably, the two walls 14a, 15a of the annular crown 5a (the walls 14b, 15b of the annular crown 5b, respectively) are made of a metallic material or in any event, a very good thermal conductor. The inner wall 15a is, for example, made of titanium and the outer wall 14a of aluminum. The lateral walls 19a, 20a of this annular crown 5a are made of a material with low thermal conductivity so that the thermal flow goes preferably past the thermal diodes 22.

In the implementation considered here as an example, the electrical generator 16 extends in annular fashion over the whole of the inner perimeter and over a width of approximately ten centimeters of the annular crown 5a.

In the case of a rotor 3a comprising 12 blades 4a, each 30° sector of the electrical generator 16 supplies electrical energy with power of about 1 kilowatt to a motor for orienting one blade. The mass of the thermal diodes 22 represented is of the order of 1 kg per 30° sector of the annular crown 5a. More generally, for n blades, each 360°/n sector supplies electrical energy to a motor corresponding to a blade 4a.

In addition, the device comprises a cable assembly 17 designed to transfer the electrical energy generated to at least one battery of known type (not shown in FIG. 5), designed to store the energy produced by the electrical generator 16, and a pitch control motor for each blade 4a of the rotor 3a.

The electric motors 18 are of a type known per se. Each electric motor 18 is positioned near the shaft 9a of a blade 4a, the forces being transmitted by gears or other known means.

The device also comprises an electronic control unit (not shown in FIG. 5).

In operation, the yield of the electrical generator 16 becomes significant as soon as the turbomachine 8 is started up as the temperature difference T2–T1 on the ground is already several hundred degrees K.

In case of necessity determined by the airplane's crew, or by an automated device, the electronic control unit of the blade pitch motors sends a feathering command simultaneously to all these engines 18. The power required, possibly much higher than the power generated by the electrical generator 16, is supplied by the batteries.

It is apparent from the description that the electrical generator according to the invention makes it possible to overcome the problems caused by fast rotating contacts such as used in the previous state of the art. It utilizes an energy resource that is lost by taking advantage of the heat generated by the propulsion unit that passes under the crown of the rotor.

The electrical generator according to the invention provides a backup system for feathering the blades of the propulsion unit's rotors.

In addition, the absence of moving parts in this generator causes increased reliability.

Lastly, its installation requires no significant changes to the propulsion unit.

The scope of this invention is not limited to the details of the embodiments considered above as an example, but on the contrary extends to modifications in the reach of the expert.

In a variant, to facilitate the installation of the thermal diodes 22, ducts channeling either hot air from the hot annular vein 10 or outside air towards a wall on which the thermal diodes 22 are installed are used instead of the caloducts 21 designed to reduce the distance between the hot source (inner wall 15a of the annular crown 5a) and the cold source (outer wall 14a of the annular crown 5a).

In another variant, a device is integrated for regulating the temperature between the hot and cold sources of the thermal diodes 22. In effect, these thermal diodes 22 have an optimal yield point for a given temperature difference and any variance from this temperature difference causes a decrease in the electrical current generated.

Such a control device can comprise air ducts that mix hot and cold air towards the hot source of the thermal diodes 22, in accordance with the instructions of an electronic control unit for the current generated by the diodes. This creates a feedback device that maximizes in real time the energy yield of the thermal diodes 22, whatever their age and the change in their maximum yield point.

It has been mentioned in the description that each motor feathering a blade 4a was powered by a sector of thermal diodes 22. Alternatively, for redundancy purposes, one can instead choose to have all the thermal diodes 22 supply the current generated to a single electronic control unit, which measures the electrical power available and distributes it among the various users of electrical energy of the rotor 3a considered, or selects a cyclical power supply mode for said energy users if the power generated is not sufficient to permanently power all these users in parallel.

In the same way, the electronic control unit communicates, by means not detailed here because they are outside the scope of this invention, the power generated by the thermal diodes 22 towards the airplane's equipment.

Moreover, using the backup power generation system proposed in the above description as the primary source of electricity for the device regulating the blades can be envisaged.

The invention claimed is:
1. An electric power generating device for a rotor of a propfan-type of aircraft propulsion unit, the propulsion unit including a turbomachine rotating at least one rotor including a plurality of blades, an outer skin of the propulsion unit being subjected to atmospheric conditions outside the propulsion unit, the turbomachine generating a flow of hot gases that are released through a hot annular channel, the device for generating electrical power comprising:

an annular crown that moves with the blades, an outer wall of the annular crown forming part of the outer skin of the propulsion unit and inner wall of the annular crown defining a portion of the hot annular channel; and means for transforming thermal energy into electrical energy, positioned between the inner wall and the outer wall of the annular crown, the means for transforming thermal energy extending in an annular fashion around all of the inner wall of the annular crown and over a predetermined width.

2. An electric power generating device according to claim 1, wherein the means for transforming thermal energy into electrical energy comprises a set of thermal diodes using Seebeck effect, the inner wall and outer wall of the annular crown, acting respectively as hot and cold sources for the thermal diodes;

the thermal diodes are arranged in groupings serially and in parallel so as to obtain on output from the electrical generator a voltage and amperage compatible with electrical requirements of the rotor.

3. An electrical power generating device according to claim 2, wherein the thermal diodes are of $Pb_{0.5} Sn_{0.5}$ Te type.

4. An electrical power generating device according to claim 2, wherein caloducts are installed between one of the walls of the annular crown and on a surface of the thermal diodes.

5. An electrical power generating device according to claim 2, further comprising means for channeling either hot air from the hot annular channel or outside air towards a wall on which the thermal diodes are installed.

6. An electrical power generating device according to claim 2, wherein the electrical generator extends in annular fashion over a whole of an inner perimeter of the annular crown.

7. An electrical energy generating device according to claim 2, further comprising means for controlling a temperature difference between the hot and cold sources of the thermal diodes, controlled according to instructions of an electronic control unit for current generated by the thermal diodes.

8. An electrical energy generating device according to claim 2, further comprising an electronic control unit to which all the thermal diodes supply the generated current; the electronic control unit configured to measure available electrical power and to distribute the power among users of energy and to select a cyclical supply mode that cycles the power among the users of energy in case an amount of power generated is below a predefined threshold.

9. A device for orienting blades of a rotor of a propfan-type aircraft propulsion unit, wherein the propulsion unit includes a turbomachine that drives in rotation at least one rotor including a plurality of blades arranged around an annular crown moving with the blades, an outer wall of the annular crown forming part of an outer envelope of the propulsion unit, the outer envelope being subjected to atmospheric conditions outside the engine, the turbomachine generating a flow of hot gases that exit via an annular hot vein, which is concentric with the moving annular crown, and defined for part of a surface thereof by an inner wall of the moving annular crown, the device comprising:

means for transforming thermal energy into electrical energy, positioned between the inner wall and the outer wall of the annular crown, the means for transforming thermal energy extending in an annular fashion around all of the inner wall of the annular crown and over a predetermined width;

means for transferring the electrical energy to electric motors that adjust a pitch of the rotor's blades; and means for controlling the electric motors.

10. An aircraft propeller, comprising at least one device according to claim 1.

11. An aircraft, comprising at least one device according to claim 1.

12. An electrical power generating device according to claim 2, further comprising:

an electric motor in the annular crown that changes a pitch of one of the plurality of blades, the electric motor directly powered by the means for transforming thermal energy into electrical energy.

13. An electrical power generating device according to claim 2, further comprising:

a plurality of electric motors in the annular crown, each electric motor changing a pitch of one of the plurality of blades, and each electric motor directly being powered by a grouping of the thermal diodes.

* * * * *